United States Patent [19]

Maron

[11] Patent Number: 5,243,693
[45] Date of Patent: Sep. 7, 1993

[54] SYSTEM FOR SIMULATING X-RAY SCANNERS

[75] Inventor: Yoram Maron, Neve Monoson, Israel

[73] Assignee: Israel Military Industries Ltd., Ramat Hasharon, Israel

[21] Appl. No.: 607,304

[22] Filed: Oct. 31, 1990

[30] Foreign Application Priority Data

Nov. 28, 1989 [IL] Israel .................................. 92485

[51] Int. Cl.$^5$ .............................................. G06F 15/62
[52] U.S. Cl. ..................................... 395/135; 395/152; 395/161; 364/409
[58] Field of Search ................ 395/132, 135, 138, 152, 395/156, 161; 364/409, 423; 434/219, 220

[56] References Cited

U.S. PATENT DOCUMENTS

| | | | |
|---|---|---|---|
| 4,653,012 | 3/1987 | Duffy et al. ................ | 395/138 X |
| 4,672,680 | 6/1987 | Middleton ................... | 395/138 X |
| 4,757,470 | 7/1988 | Bruce et al. ................. | 395/135 |
| 4,837,706 | 6/1989 | Iijima .......................... | 395/135 |
| 4,868,766 | 9/1989 | Oosterholt .................... | 395/156 X |
| 4,991,117 | 2/1991 | Iwamura et al. ............. | 395/138 X |
| 5,067,087 | 11/1991 | Seki et al. .................... | 395/135 X |
| 5,093,798 | 3/1992 | Kita .............................. | 395/135 |
| 5,099,846 | 3/1992 | Hardy .......................... | 364/413.22 X |

Primary Examiner—Mark K. Zimmerman
Attorney, Agent, or Firm—Helfgott & Karas

[57] ABSTRACT

A system for simulating X-ray scanners includes a first memory for storing a database of component X-ray images, a second memory for storing an instruction set and respective relative opacities of the stored component images, and a computer coupled to the first and second memories and responsive to the stored instruction set for creating composite X-ray images from the stored component images. A display is coupled to the computer for displaying at least one of the composite X-ray images as a displayed image. A data entry keyboard is coupled to the computer to permit data to be entered thereto in accordance with the stored instruction set. A selection device is coupled to the computer for comparing the selected component image with a subset of the stored component images representing hazardous objects so as to determine whether the selected component image matches one of the component images in the subset. The system further includes a reporting device coupled to the computer for reporting whether a match occurred.

20 Claims, 4 Drawing Sheets

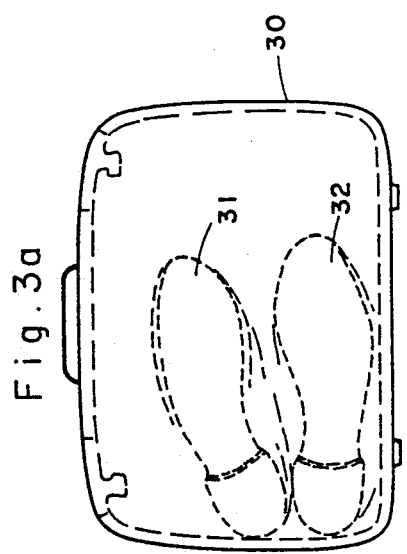
Fig. 3a
Fig. 3b
Fig. 3c
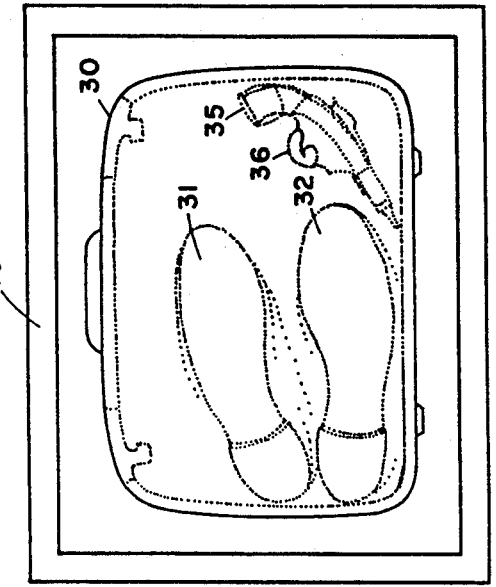
Fig. 3d
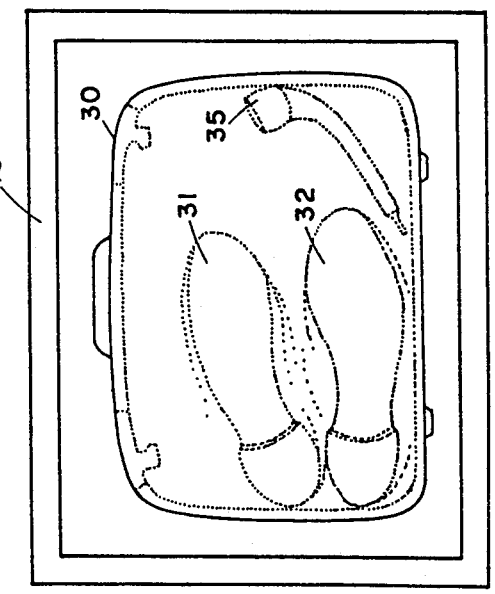
Fig. 3e

SYSTEM FOR SIMULATING X-RAY SCANNERS

FIELD OF THE INVENTION

This invention relates to simulators. In particular, it relates to a computerized simulator for simulating X-ray scanners such as are used in airports and the like.

BACKGROUND OF THE INVENTION

X-ray scanners, such as are used by airport authorities for checking luggage, are increasingly important in the fight against international terrorism. It is current policy at many airports to check not only cargo luggage but hand luggage also using X-ray scanners in order to locate the presence in a passenger's luggage of explosives, firearms and other ammunition.

Clearly, the effectiveness of such scanners depends upon the experience and expertise of the operator. X-ray scanners operate by passing the luggage along a conveyer belt through an X-ray machine which produces a visual image of the contents of the luggage on a suitable display unit. The operator can, and will, stop the conveyer belt in order to examine the contents of a particular piece of luggage and can also zoom in on a particular area of the screen in order to check an identified area more closely.

On account of the increasing passenger throughput at major airports, it has become increasingly necessary to process passenger luggage quickly. This requirement often militates against efficiency and, at worst, is responsible for the successful attempts in recent years by terrorists to smuggle bombs and explosives in their luggage.

Up till now, airport security personnel using X-ray scanners have developed their expertise through experience and through learning from more experienced operators. Since it takes very many years indeed to acquire the necessary expertise and since, moreover, terrorists are themselves developing more sophisticated methods of hiding firearms and so on in their luggage, it is not always easy for even experienced operators to be one step ahead of the terrorist and traditional methods of teaching novices are, at best, cumbersome.

Simulators for simulating moving images are, of course, known. Generally, such simulators employ animation techniques for producing a moving image based either on video processing or graphics techniques.

Video processing techniques require that a moving object is photographed very rapidly so as to produce at least 30 still images of the moving object each second. The still images, or frames, are then displayed on a suitable display screen whereby the impression of flicker-free continuous movement is achieved owing to the eyes' persistence of vision. A drawback with such techniques when used with computer-based simulators is that a very large volume of computer memory is required in order to store all the frames of image data. Thus, if for each second of vision time there are required 30 frames of image data, it is clear that to simulate a moving image for even a short period of time can require prohibitively large amounts of memory.

Graphics techniques require that a still image be digitized into the computer's memory which is itself a highly skilled, time-consuming and consequently expensive process. Once stored within the computer memory, the computer itself may be programmed to generate successive frames of image data whose rapid display creates the impression of movement in a similar manner to the video technique described above.

Consequently, both of the standard prior art techniques for creating moving images are expensive, either owing to the large volume of memory required or owing to the digitization of a stationary image.

BRIEF SUMMARY OF THE INVENTION

It is a principal object of the invention to provide a system for simulating X-ray scanners which, when used as a teaching aid, overcomes or significantly reduces the drawbacks associated with hitherto proposed systems.

It is a further object of the invention to provide a method for simulating a moving image which is particularly adapted for use with an X-ray simulator according to the invention and wherein the drawbacks associated with hitherto proposed methods are significantly reduced or eliminated.

According to a broad aspect of the invention there is provided a system for simulating X-ray scanners, said system comprising:

a first memory for storing a database of component images, a second memory for storing an instruction set, computing means coupled to the first and second memories and responsive to the stored instruction set for creating composite images from the stored component images, display means coupled to the computing means for displaying at least one of the composite images as a displayed image, data entry means coupled to the computing means for entering data thereto in accordance with the stored instruction set, selection means coupled to the computing means for selecting a component image from the displayed image, comparing means coupled to the computing means for comparing the selected component image with a subset of the stored component images so as to determine whether the selected component image matches one of the component images in said subset, and reporting means coupled to the computing means for reporting whether a match occurred.

According to a further aspect of the invention there is provided a method for simulating movement of an image, comprising the steps of:

photographing the image so as to produce a single frame stationary image, segmenting the stationary image so as to derive a plurality of consecutive image segments, and shifting the consecutive image segments along corresponding sections of a display monitor at a rate whereby the single frame stationary image appears to move across said monitor.

Thus, when used for airport security systems, a system according to the invention includes a computer containing a database of component images corresponding, generally, to non-hazardous "background" images and hazardous "foreground" images. In one mode, the computer may be programmed to combine various of the background and foreground images so as to produce a prearranged lesson in which the hiding of dangerous firearms and the like in a passenger's luggage may be simulated. The simulated image is then presented on a suitable display terminal and a student employs the selection means in order to identify a component image which he believes to represent a hazardous item.

Preferably, standard X-ray scanner functions are provided such as, for example, displaying many images on the display terminal simultaneously, stopping and restarting a conveyer belt on which passenger luggage is conveyed so as to permit close scrutiny of a particular piece of luggage, and so on.

Preferably, the computer may also identify a hazardous piece of luggage so that novice students may learn to identify their contour when concealed amongst other luggage. Furthermore, a printer connected to the computer facilitates the preparation of printed reports which summarize a student's performance during the simulation.

The method for simulating the moving image is particularly adapted for use with the simulated X-ray scanner according to the invention which simulates the movement of passenger luggage along a conveyer belt. The method requires that only a single frame of image data be stored derived from a still X-ray photograph of the piece of luggage which is to be displayed. The single frame of image data is segmented so as to provide a plurality of consecutive image segments which are then shifted along corresponding segments of a display terminal at a sufficiently high rate to produce the impression of continuous, flicker-free movement. Such a method requires the provision of relatively little computer memory for storing each image and avoids the need for time-consuming image digitization which is required in prior art animation techniques.

BRIEF SUMMARY OF THE DRAWINGS

The invention will now be described, by way of non-limiting example only, with reference to a system for simulating airport security X-ray scanners and with reference to the accompanying drawings, in which:

FIGS. 3(a), (b), (c), (d) and (e) show various component images which may be stored and superimposed in the systems shown in FIGS. 1 and 2 for simulating a passenger's luggage;

DETAILED DESCRIPTION OF A PREFERRED EMBODIMENT

Figure 1:
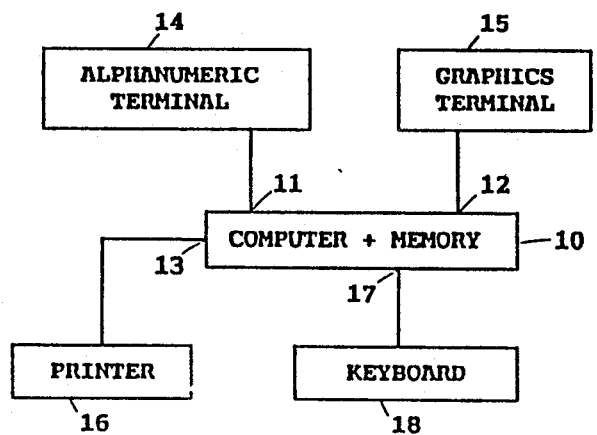
FIG. 1 is a block diagram showing functionally the principal components in a first embodiment of a system according to the invention.

FIG. 1 shows a computer 10 having first, second and third output terminals 11, 12 and 13, respectively. To the first, second and third outputs 11, 12 and 13, respectively, are connected an alphanumeric terminal 14, a graphics terminal 15 and a printer 16. Also connected to an input 17 of the computer 10 is a keyboard 18 having cursor control keys for enabling pixels on the graphics terminal 15 to be identified.

The computer 10 contains a database of component images which may be combined in accordance with an instruction set stored within the computer 10 so as to generate composite images which are displayed on the graphics terminal 15. A menu of graphics functions is displayed on the alphanumeric terminal 14 permitting an operator to operate the system in accordance with the prestored instruction set by selecting a desired function from the menu displayed on the alphanumeric terminal 14 with the aid of the cursor control keys or other suitable selection means.

Figure 2:
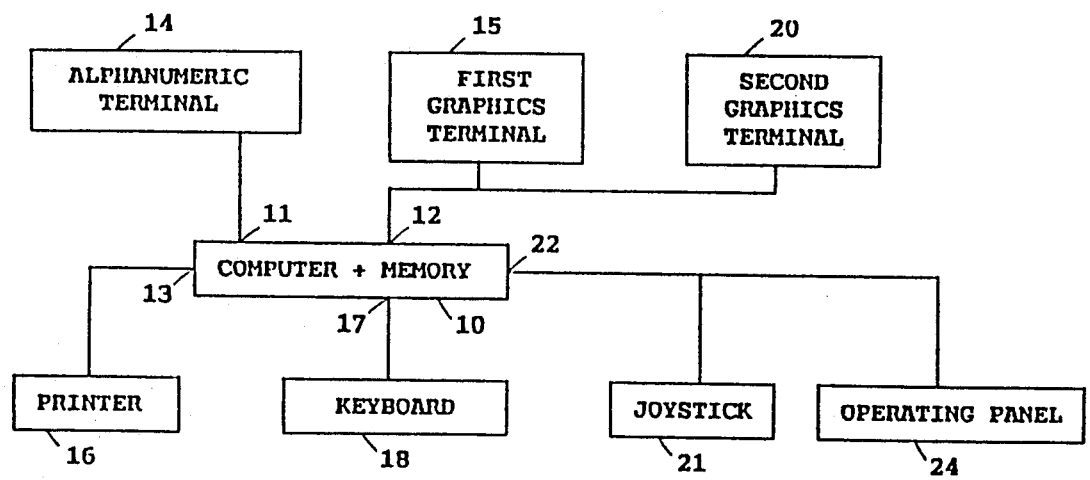
FIG. 2 is a block diagram showing functionally the principal components in a second embodiment of a system according to the invention.

FIG. 2 shows a variation of the above system in which a second graphics terminal 20 is connected to the output 11 of the computer 10 and a joystick 21 is coupled to a second input 22 of the computer 10, to which there is also connected an operating panel 24. All other components are identical to those described above with reference to FIG. 1 and share identical reference numerals.

In the configuration shown in FIG. 2, the alphanumeric terminal 14, the first graphics terminal 15, the printer 16 and the keyboard 18 are for use by an instructor whilst the second graphics terminal 20, the joystick 21 and the operating panel 24 are for use by a student.

In use, there are three modes of operation. A first mode permits creation of a lesson which is stored within a memory (not shown) associated with the computer 10. During a second mode of operation the stored lesson is run for use by a student and in a third mode of operation a report is printed by means of the printer 16 for analysis by both the teacher and the student of the student's performance during the lesson.

Referring to FIG. 3, there will now be described a sample lesson which is stored and subsequently run in accordance with the invention. FIG. 3(a) shows a suitcase 30 containing therein a pair of shoes 31 and 32. The suitcase 30 and the shoes 31 and 32 together constitute a composite background image which is stored within the computer database.

FIG. 3(b) represents a smoker's pipe 35 and FIG. 3(c) shows a firearm 36 both of which are stored as separate component background and foreground images, respectively, within the computer database. FIG. 3(d) shows a combined image on the graphics terminal 15 showing the suitcase 30, the shoes 31 and 32 and the smoker's pipe 35. The combined image shown in FIG. 3(d) is prepared by the instructor who, during the course of preparing a lesson, may display on the graphics terminal 15 a large number of component images within the computer database so as to select items for packing in the suitcase 30. Having selected an item from the computer database, the instructor is then able to place it at any desired location within the suitcase 30 under control of the cursor control keys in the keyboard 18 or by any other suitable means.

FIG. 3(e) shows a subsequent stage during the preparation of a lesson wherein the instructor has added the firearm 36 to the displayed image and has placed it so that it substantially overlies the smoker's pipe 35. Thus, FIG. 3(e) represents the complete image of a packed suitcase for subsequent analysis by a student.

During the second mode of operation, by a student, a series of images, such as that shown in FIG. 3(e), is presented to the student in quick succession corresponding to the real-life situation wherein luggage is scanned during its passage on a conveyer belt through an X-ray scanner. When the student confronts a displayed image which appears suspicious, the display may be "frozen" and various image processing means may be employed in order to scrutinize the displayed image.

The image processing means correspond to control functions which are presented to the student by means of a menu on the alphanumeric terminal 14. The control functions displayed in the menu are identical to those existing in an actual X-ray scanner and include: the ability to effect contrast adjustment of the displayed image; performing "zoom control" in order to expand a selected area of the displayed image; controlling the sharpness of the displayed image; reversing the brightness of the image so that dark areas appear light and vice versa; and also improving the image contrast of the displayed image by effecting appropriate colour adjustment.

The first and second graphics terminals 15 and 20 are conventional raster scan CRTs and the component and composite images are displayed thereon by illuminating corresponding pixels of the display terminals according to the image data in the computer database. Typically, the displayed images are black and white images, each pixel (or picture element) having an associated grey level which is stored in the computer database and which can be varied by the image processing means under instructor or student control, in known manner.

Edge enhancement means are also provided for increasing the contrast at the boundary between adjacent objects in order to enable a student to discriminate more easily between adjacent objects. The edge enhancement means are operated by defining a window on the second graphics terminal 20 using the joystick 21, the computer 10 being adapted to scan all the pixels within the defined window so as to determine the difference between the respective grey levels of adjacent pixels. Where the measured difference exceeds a predetermined threshold, the adjacent pixels represent respective edge pixels in adjacent objects. Thus, by expanding the grey level range for these pixels, the edge between adjacent objects may be highlighted permitting the objects to be discriminated more easily.

It can also sometimes be helpful to display different grey level ranges by appropriate colours on a colour graphics terminal by mapping the appropriate grey level ranges onto an appropriate colour palette stored within the computer memory. By this means, either black and white or corresponding "colour" images may be displayed, as required, the different colours of a colour image providing a highly effective visual representation of the relative X-ray opacity of respective areas of the displayed image.

However, it will be appreciated that the above features are merely representative of the control functions which are provided and the invention envisages that any control function associated with real-life X-ray scanners may be programmed into the simulation system.

Thus, if the student suspects that the composite image displayed in FIG. 3(e) contains a firearm, he may freeze the display and zoom in on the suspect area showing the smoker's pipe 35 overlying the firearm 36. He can then point the display cursor to the firearm 36 and select it using, for example, the joystick 21 shown in FIG. 2.

The computer compares the selected component image 36 with a subset of component images corresponding to firearms, explosives and the like, in order to determine whether the selected image 36 corresponds to one of the subset of such images. It then generates a report detailing the student's performance in the simulation including, for example, such information as accuracy, speed, total number of images in lesson, and so on. The report is printed by the printer 15 for subsequent analysis by both the student and the instructor.

In the event that the student is presented with a lesson wherein the displayed composite image is known to include a firearm or explosive, but the student is unable to identify its location, he may request that the system shows him the hidden firearm by selecting a suitable control function from the displayed menu. By this means, the simulator is highly effective as a self-teaching program.

Having described the principal features of the invention, there will now be described with reference to FIG. 4 of the drawings an algorithm for processing component images in order to produce composite images which may subsequently be stored in the computer database.

In dotted lines there is shown a pre-processing stage wherein video images of background and foreground objects are captured for subsequent storage in respective databases. The video capture or GRAB operation is achieved using known techniques and, in particular, requires only that a single frame video photograph be taken and stored. Each video photograph is taken using an X-ray video camera which produces a conventional X-ray image of the photographed object. The background images, comprising non-hazardous objects, may be single object component images which are subsequently superimposed so as to form composite background images or, alternatively, they may themselves be composite background images produced by photographing, for example, a suitcase filled with suitable items of luggage. In this respect, it should be understood that the distinction between a "component" image and a "composite" image is merely that a composite image is a superimposition of one or more component images which may themselves be composite images. The component images, each containing one or more background items, are stored in an AUXILIARY DATABASE. Additionally, firearms, explosives and other hazardous items are photographed separately with an X-ray video camera and the resultant images are stored in a FOREGROUND DATABASE.

At the start of the procedure a background image is selected from either the BACKGROUND IMAGES DATABASE or the COMPOSITE IMAGES DATABASE corresponding, respectively, to component and composite images. The background image is displayed on the graphics terminal 15 and a foreground image corresponding to firearms, explosives and the like is then selected from the FOREGROUND DATABASE. The database record corresponding to the selected foreground image is analysed so as to extract therefrom the contour of the selected foreground image which is then displayed on the top left corner of the graphics terminal 15.

The displayed contour may be moved by operating the joystick 21 in order to place the FOREGROUND IMAGE at a required location with the BACKGROUND IMAGE. This having been done, the displayed composite image may now be saved in the COMPOSITE IMAGES DATABASE from which it may then be extracted during the preparation of further lessons.

Figure 4:
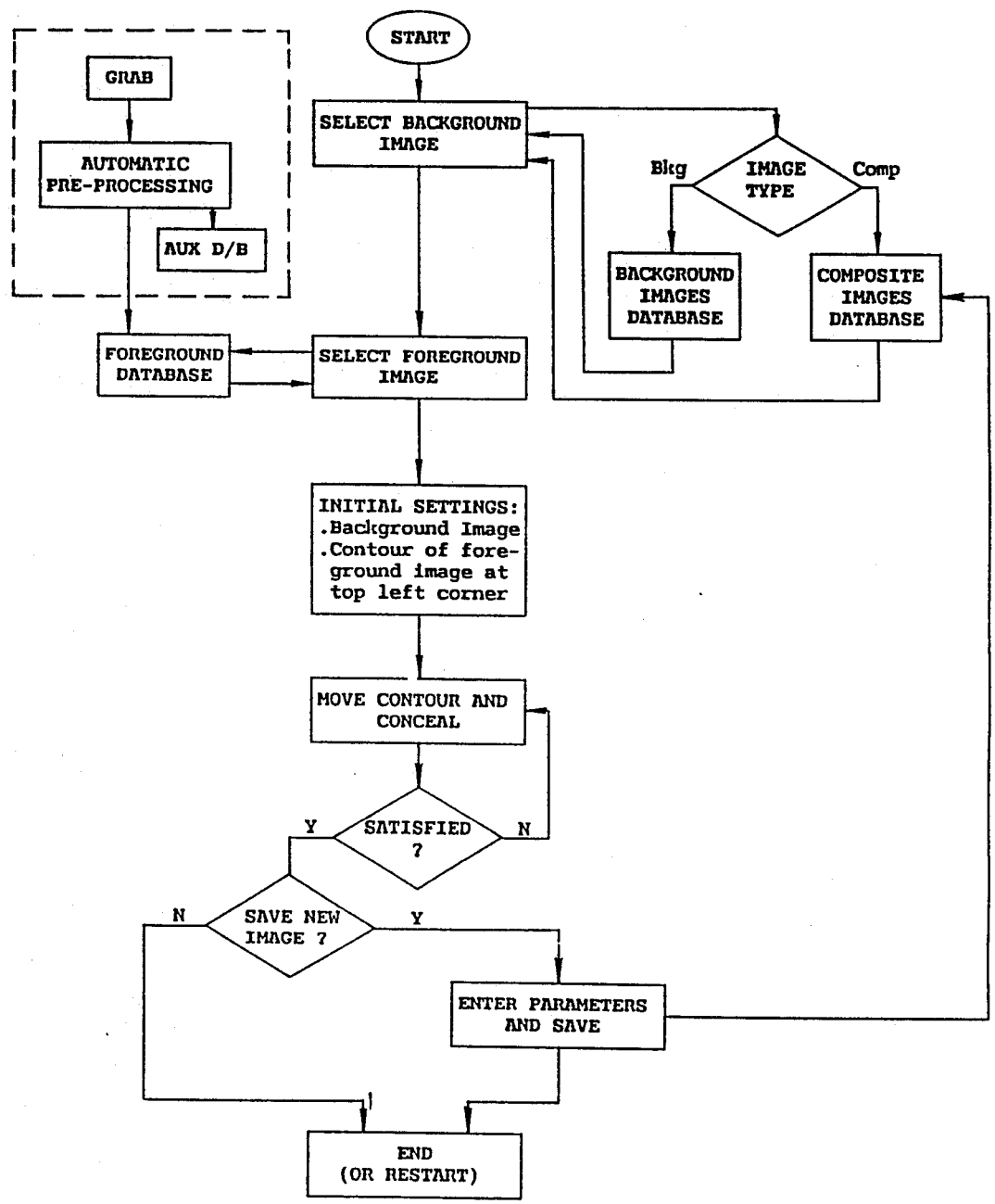
FIG. 4 is a flow diagram of an algorithm for producing composite images in a system according to the invention.

Relating the algorithm shown in FIG. 4 to the various displays shown in FIG. 3 of the drawings, it will now be clear that FIG. 3(a) is a background image stored in the BACKGROUND IMAGES DATABASE. FIG. 3(b) showing a smoker's pipe represents a component background image stored in the BACKGROUND IMAGES DATABASE and which, when superimposed on the image shown in FIG. 3(a) produces a new composite image, FIG. 3(d), which itself may be stored in the COMPOSITE IMAGES DATABASE.

Alternatively, it will be understood that the composite image shown in FIG. 3(d) may be produced directly by photographing the suitcase 30 containing the shoes 31 and 32 and the smoker's pipe 35 and storing the resultant composite image directly in the COMPOSITE IMAGES DATABASE. This applies equally to the image shown in FIG. 3(e) wherein the firearm 36 has been secreted behind the smoker's pipe 35. Thus, the system is completely flexible and permits composite images to be constructed either by successively superimposing, in any combination, selected background and foreground images or, alternatively, by directly X-ray photographing a packed suitcase corresponding to the required composite image.

Moreover, it will be appreciated that, in addition to storing X-ray photographs of the component and composite images, conventional visible-light photographs of these images may also be stored and the computer 10 may then be adapted, under operator control, to select either one of the stored images. Thus, suitable mode selection means (not shown) provided on the operating panel 24 permit an operator to choose between X-ray and conventional images on the graphics terminals 15 or 20 so that an obscure X-ray image may be transformed to a conventional image rendering it immediately recognisable. This feature is particularly useful as a teaching aid for helping students recognise the contents of X-rayed luggage.

Referring now to FIG. 5 of the drawings there will be described a method for simulating movement of a composite image. FIG. 5(a) shows a composite image 40 corresponding to the image shown in FIG. 3(e) of the drawings. The image 40 is stored in the COMPOSITE IMAGES DATABASE and the stored data is segmented so as to derive a plurality of consecutive image segments 41 to 49, respectively.

Figure 5A:
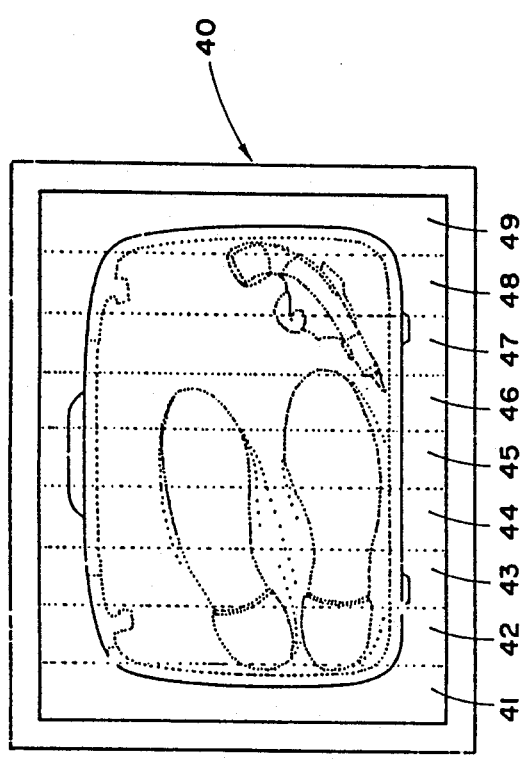
FIG. 5(a) shows a composite image stored in the composite images database and FIGS. 5(b), 5(c) and 5(d) show respective stages of the simulation of movement of a single frame image.
Figure 5B:
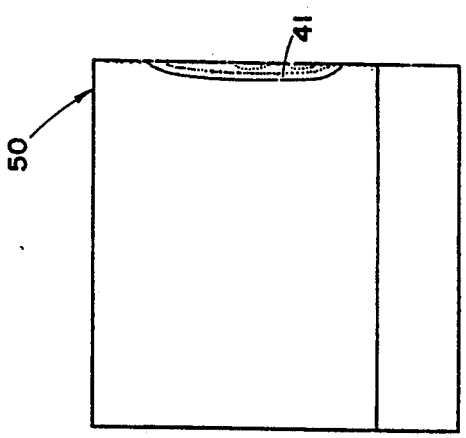
Figure 5C:
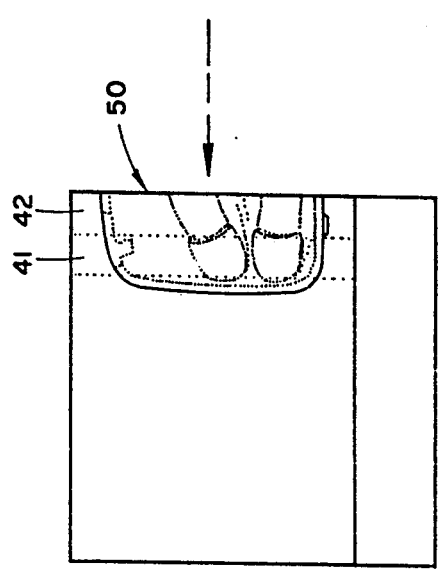
Figure 5D:
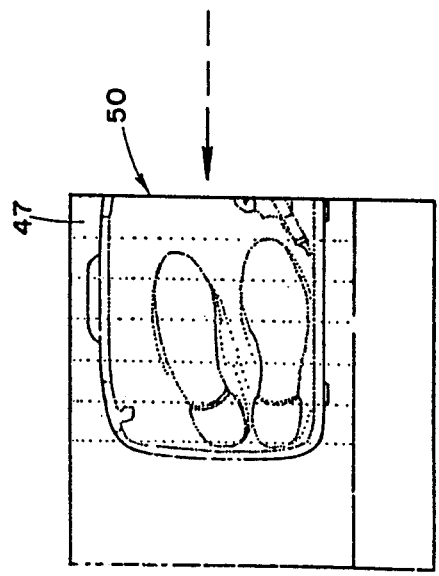

FIG. 5(b) shows a first stage of display wherein the first image segment 41 is displayed on a corresponding portion of a display monitor 50. FIG. 5(c) shows a second stage wherein the first segment 41 is shifted one segment to the left of the display monitor 50 whilst the second image segment 42 is likewise shifted into view so as to occupy the portion of the display monitor 50 previously occupied by the first display segment 41. This operation of shifting the image segments across corresponding portions of the display monitor 50 continues in rapid succession, the display shown in FIG. 5(d) corresponding to the situation where the seventh image segment 47 is shifted into view at the extreme right-hand edge of the display monitor 50.

In such manner, the image shown in FIG. 5(a) of the drawings may be made to appear as though it is moving across the display monitor 50 simulating movement of luggage along a conveyer belt.

It should also be understood that by creating additional successive images each differing from a preceding image in respect of a discrete movement of one or more selected features of the stationary image, whereby shifting consecutive image segments of the successive images along corresponding sections of the display monitor 50 creates apparent movement within the image as it moves across the display monitor 50.

It will be apparent that many modifications can be effected to the system in order both to enhance its performance and to tailor it to the specific needs of different students. Furthermore, modifications to the hardware will be apparent to those skilled in the art such as, for example, displaying the menu on the graphics terminal 15 or 20 and dispensing with the alphanumeric terminal 14. In this case, provision may be made for shifting the position of the displayed menu so that the displayed image superimposed on the menu may be seen unimpeded by the menu.

Additionally, the system is intended for coupling to actual X-ray scanners in order to enhance the effectiveness of such scanners during their normal operation. Such coupling is achieved by connecting the video output of the X-ray scanner to the video input of the simulator.

Finally, whilst the invention has been described with particular reference to X-ray scanners for airport security systems, it will be appreciated that it is equally applicable to other X-ray scanners such as, for example, are used by postal authorities in order to check for the presence of parcel bombs and the like.

I claim:

1. A system for simulating X-ray scanners, comprising:

a first memory for storing a database of component X-ray images each having respective relative opacities, a second memory for storing an instruction set, computing means coupled to the first and second memories and responsive to the stored instruction set and to said respective relative opacities of the stored component X-ray images for creating composite X-ray images having respective relative opacities from the stored component X-ray images, display means coupled to the computing means for displaying at least one of the composite X-ray images as a displayed X-ray image, data entry means coupled to the computing means for entering data thereto in accordance with the stored instruction set, selection means coupled to the computing means for selecting a component X-ray image from the displayed X-ray image, comparing means coupled to the computing means for comparing the selected component X-ray image with a subset of stored component X-ray images representing hazardous objects so as to determine whether the selected component X-ray image matches one of the component X-ray images in said subset, and reporting means coupled to the computing means for reporting whether a match occurred.

2. The system according to claim 1, wherein:

the component X-ray images include background X-ray images and foreground X-ray images, and the foreground X-ray images include said subset;

the composite X-ray images being formed by combining predetermined ones of the background X-ray images and foreground X-ray images in accordance with the instruction set.

3. The system according to claim 2, wherein the composite X-ray images simulate at least one of said hazardous objects hidden amongst at least one of the background X-ray images by simulating an overlap between the X-ray image of each of said hazardous objects and the X-ray image of each background image.

4. The system according to claim 1, wherein:

each one of the component X-ray images is a respective single frame video image comprising a plurality of pixels having respective grey levels, and the computing means is responsive to the grey levels of respective pixels associated with overlapping component images for deriving a resultant pixel in the composite X-ray image having a composite grey level in accordance with a predetermined X-ray attenuation function.

5. The system according to claim 1, wherein:

the computing means includes contour generating means for generating respective contours of the component X-ray images, the display means is responsive to the computing means for displaying said contours, and the selection means is adapted to select one of the displayed contours for positioning the corresponding component X-ray image in a desired location within the composite X-ray image.

6. The system according to claim 5, wherein the computing means is responsive to the instruction set for storing the displayed composite X-ray image within said database.

7. The system according to claim 6, wherein for each X-ray image in the database there are stored corresponding X-ray and visible light images, and there are further provided mode selection means for displaying an X-ray image stored in the database as an X-ray or as an equivalent visible light image.

8. The system according to claim 1, wherein the data entry means includes a keyboard for entering alphanumeric data, whereby an X-ray image is extracted from the database by entering a corresponding file access code.

9. The system according to claim 1, wherein the display means is responsive to the computing means for displaying a plurality of X-ray images simultaneously.

10. The system according to claim 9, wherein the data entry means includes graphics selection means for extracting an X-ray image from the database by selecting said X-ray image graphically from said plurality of displayed x-ray images.

11. The system according to claim 1, wherein the display means includes an alphanumeric terminal for displaying an instruction menu.

12. The system according to claim 1, wherein an instruction menu is displayed together with the composite X-ray image on a graphics terminal, there being further provided means for moving the displayed menu with respect to the displayed composite X-ray image.

13. The system according to claim 1, wherein there are further provided indicating means for indicating within the composite X-ray image all component X-ray images contained within the subset.

14. The system according to claim 1, wherein the displayed X-ray image comprises a plurality of pixels having respective grey levels and pixel data corresponding thereto are stored in a memory of the computing means, and there are further provided image processing means coupled to the memory of the computing means for manipulating said pixel data so as to alter the displayed X-ray image.

15. The system according to claim 14, wherein the image processing means includes:

contrast adjustment means for adjusting the contrast of the displayed X-ray image, zoom control means for expanding the composite X-ray image to obtain an expanded X-ray image and displaying successive segments of the expanded X-ray image, sharpness control means for controlling the sharpness of the displayed X-ray image, reverse imaging means for inverting the displayed X-ray image, and edge enhancement means responsive to a difference between respective grey levels of adjacent pixels for expanding said difference so as to highlight edges in the displayed X-ray image.

16. The system according to claim 15, wherein the display means includes a color display monitor and there are further included color processing means coupled to the computing means and responsive to said grey levels for replacing predetermined ranges of grey levels by respective predetermined colors.

17. The system according to claim 15, further including windowing means for defining a window on the display means, the image processing means being responsive to the respective pixel data relaxing to the pixels in said window for altering the displayed X-ray image in said window only.

18. The system according to claim 14, wherein the image processing means further includes:

segmenting means for segmenting a selected one of the composite X-ray images so as to derive a plurality of consecutive stationary image segments, shifting means for shifting the consecutive stationary image segments along corresponding sections of the display means, whereby the selected composite X-ray image appears to move across the display means, generating means for generating successive images of the selected composite X-ray image, each of said successive images corresponding to a discrete movement relative to a respective preceding image of selected features of the stationery image segments, stop means coupled to the shifting means for freezing the displayed composite X-ray image, and restart means coupled to the shifting means for restarting the shifting means after an interruption.

19. A system according to claim 15, wherein the image processing means further includes:

generating means for generating successive images of the selected composite image, each said successive image corresponding to a discrete movement relative to a respective preceding image of selected features of the stationary image;

whereby shifting consecutive image segments of the successive images along corresponding sections of the display means creates apparent movement within the image as it moves across the display means.

20. The system according to claim 1, wherein there is further provided a coupling means for coupling the first memory to an X-ray scanner, whereby pixel data of an X-ray image produced by the X-ray scanner may be downloaded to said first memory.

* * * * *